United States Patent [19]

Shaparew

[11] Patent Number: 4,483,031

[45] Date of Patent: Nov. 20, 1984

[54] VENTILATING INNER COVER FOR BEEHIVES

[76] Inventor: Vladimir Shaparew, 3371 Trafalgar Rd., R.R. #1, Oakeville, Ontario, Canada, L6J 4Z2

[21] Appl. No.: 488,366

[22] Filed: Apr. 25, 1983

[51] Int. Cl.³ ............................................. A01K 47/06
[52] U.S. Cl. ............................................................ 6/1
[58] Field of Search ........................ 6/1, 2 R, 4 R, 4 B

[56] References Cited

U.S. PATENT DOCUMENTS

| | | | |
|---|---|---|---|
| 182,009 | 9/1876 | Wilson | 6/4 R |
| 2,292,110 | 8/1942 | Evans | 6/1 |
| 2,340,219 | 1/1944 | Hawkins | 6/2 R |
| 2,578,103 | 12/1951 | Stulce | 6/4 R |
| 2,654,900 | 10/1953 | Kelley | 6/1 |
| 2,680,858 | 6/1954 | Baumgartner | 6/1 |
| 3,927,431 | 12/1975 | Wallace | 6/1 |
| 3,994,034 | 11/1976 | Van Damme | 6/1 |
| 4,153,960 | 5/1979 | Simoni | 6/1 |
| 4,300,250 | 11/1981 | Taylor | 6/1 |

OTHER PUBLICATIONS

Nov. 1982, "Wintering Results Using Ventilating Inner Covers" Gleanings in Bee Culture, pp. 610 and 612.
Fall 1981, "Ventilation Requirements of a Beehive in Winter" Canadian Beekeeping, vol. 9, No. 7; pp. 105 to 112.

Primary Examiner—Robert P. Swiatek
Attorney, Agent, or Firm—Donald E. Hewson

[57] ABSTRACT

A ventilating inner cover, for a beehive wintering outdoors, is disclosed. The inner cover provides adequate, but not excessive ventilation while preventing a draft through the beehive. The inner cover embodies a ventilation channel that connects the top-center volume of the upper brood chamber with the outside atmosphere. The ventilation channel is simple to construct, being formed into the structure of the inner cover.

7 Claims, 3 Drawing Figures

U.S. Patent  Nov. 20, 1984  4,483,031
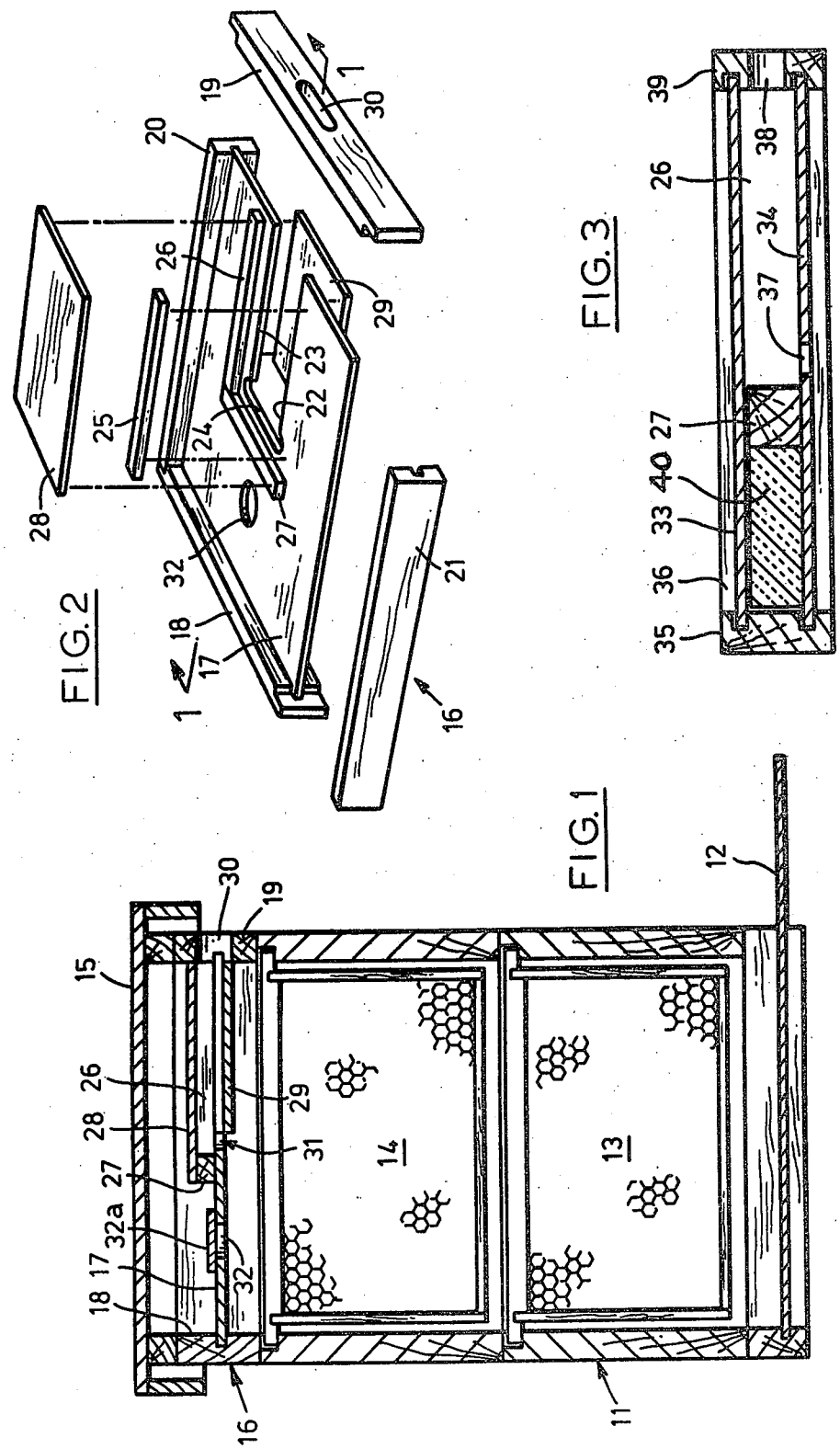

0
VENTILATING INNER COVER FOR BEEHIVES

BACKGROUND OF THE INVENTION

This disclosure refers to beehives wintered outdoors.

To sustain life and produce warmth during winter, the bees consume honey. The main by-products of honey assimilation by the bees are carbn dioxide and water. For each pound of honey consumed, about 0.66 pounds of water and about 1.22 pounds of carbon dioxide are produced. When the outdoor temperature falls below about 44 degrees F., the bees form a cluster in the hive to conserve heat. During winter, the bees do not control the temperature within the hive outside the cluster. Indeed, the temperature outside the cluster is only a few degrees above the ambient outside air temperature. Under such conditions the water vapour, formed by assimilation of honey, which was not ventilated out, will condense and sometimes freeze on the cold internal surfaces of the beehive and frames with comb.

The aforementioned carbon dioxide, however, must be ventilated out in order that fresh air can enter the beehive. Without adequate supply of oxygen the bees can not assimilate the honey, and they will suffocate.

Starting about the middle of summer, the bees propolise all small cracks, which would allow air passage to the outside. However, cracks exceeding about 3/16" height can not be successfully propolised because the propolis is soft and therefore flows during hot summer weather. Deteriorating equipment, like rolled out corners of the brood chambers, are likely to have larger holes which can not be propolised. The bees are able to winterise their hive by propolising only during warm weather, when the propolis is soft. If the inner cover was opened up, for whatever reason, late in fall, the bees will not be able to again propolise the interface between the inner cover and the upper brood chamber because it is too cold.

A beehive prepared for wintering by a beekeeper normally has a reduced, but open, front bottom bee entrance. If any cracks or openings do exist on either of the side walls, back wall, or in the inner cover, except for the openings on the front wall, the beehive will be subjected to a draft of air blowing through the hive during windy periods.

Overventilation caused by a draft through the hive can also freeze the bees. For continuous survival, the bees on the outer layer of the cluster maintain the minimum temperature of about 44 degrees F. irrespective of the outside temperature. A draft through the hive during a cold spell may remove more heat from the hive than the cluster can produce. As a result, the outer layer of bees on a cluster will freeze and drop off, exposing the next layer of bees to the same condition, until the entire cluster of bees dies out.

In the fall when the outdoor temperature drops below 44 degrees F., the bees in the hive form a cluster, generally in the lower brood chamber. As they consume honey they move upward, and in two to three months the cluster will reach and contact the inner cover of the upper brood chamber. During all this and the subsequent period, the bees must have continuous ventilation to provide an adequate oxygen supply in order to survive.

PRIOR ART

In an attempt to provide some upper ventilation, either a hole, ¾" to 1" diameter is drilled in the front wall of the brood chamber or a notch ¼" deep by about 2" long is cut out in the rim of a standard inner cover. Neither of these ventilation provisions have proven adequate in the past.

As the cluster eats its way up in the beehive, it maintains proximity to the front wall of the hive, where the ventilation hole or slot is. The bees fan or beat their wings at the ventilation hole or slot, provided the temperature of air surrounding the bee is 44 degrees F. or higher. Any bee which leaves the cluster will quickly die in the cold air. Hence the cluster remains near the hole for ventilation. When the cluster has reached the inner cover, which is the top of upper brood chamber, the bees have consumed most of the honey in the front part of the hive. Progressively then, the cluster moves towards the back of the brood chamber for food. While the outdoor temperature remains well below 44 degrees F., the bees will stay in a cluster at the back of the brood chamber, separated from the ventilation hole by a cold air space. From this location the bees are not able to exhaust foul air and depend exclusively on the meager convective circulation for their oxygen supply. This convective circulation takes place only at the front wall, in at the bottom and out the top and such convective circulation proves itself to be grossly inadequate. The bees may then begin to die from suffocation. At this point the cluster moves toward the front wall and the ventilation hole. However, having moved forward, the cluster loses contact with food. Thus all bees die from starvation, being only inches away from food. Such an occurance is a common one. Not understanding the real cause of the bees death, beekeepers blame the cold weather for bees' inability to reach the food.

U.S. Pat. No. 4,153,960 (SIMONI, May 15, 1979) which is directed to an indoor hive, in which ventilation might be thought to require special measures. However, simple holes in the walls are all that are provided. U.S. Pat. No. 3,927,431 (WALLACE, Dec. 23, 1975) shows a ventilator designed to promote a through-flow or draft for enhancing the hive's performance in summer: however, as discussed above such a ventilator in winter could quickly cause the bees to die from cold. U.S. Pat. No. 3,994,034 (VAN DAMME, Nov. 30, 1976) provides an electric hive heater which gives rise to a through-flow of air in winter to produce a "curtain" of warm air to insulate the walls of the hive.

OBJECTS OF THE PRESENT INVENTION

In this invention, a ventilation channel is provided with its inlet port disposed in the centre of the inner cover and its outlet port disposed outside the hive.

I have determined from tests, experimentation and observations that the temperature in the centre of a bee cluster is about 90 degrees F. The temperature of carbon dioxide and water vapour, which are expelled from the cluster, is substantially higher than the temperature of air within the hive outside of the cluster. Thus, because of the difference in temperature and therefore the difference in densities, a convective column is established. The warmer mixture of carbon dioxide, water vapour and air, rises from the cluster to the top of the brood chamber. From here, this mixture moves through a ventilation inlet port and a ventilation channel, and exits to the outside through the outlet port. Fresh air enters through the beehive through the bottom bee entrance. Thus a positive convective ventilation is established even when the bee cluster is in the bottom brood chamber and not in contact with the ventilation inlet port. During the latter part of the winter the cluster moves up and contacts the inlet ventilation port. The bees may move into and occupy the ventilation channel. By this time, the bees start to rear the brood, which increases the honey consumption and therefore increases the carbon dioxide production. The bees within the ventilation channel periodically fan their wings, and by so doing they draw out the foul air from the hive and exhaust it to the outside through the ventilation outlet port.

Provision of ventilation within a beehive in the manner as described immediately above allows the cluster to be in any position within the hive, (front, back, up, down, sideways), where the food is, while being assured of an adequate oxygen supply.

The ventilating inner cover is placed over the upper brood chamber with its outlet ventilating port facing the front of the hive. The bottom bee entrance is on the same wall, lower down on the bottom board. For a beehive which is reasonably airtight elsewhere, the air pressure on the same external wall at the two openings is the same, regardless of wind direction. Therefore, the ventilating channel outlet port in the same face as the bottom bee entrance does not cause any draft through the hive.

The continuing experiment and research which has led to the structures of ventilating inner covers for beehives, as described in detail hereafter, have been discussed in part in my articles entitled "Ventilation Requirements of a Beehive in Winter", published in *Canadian Beekeeping*, Volume 9, No. 7, Fall 1981, at pages 105 to 112; and "Wintering Results Using Ventilating Inner Covers", published in *Gleanings In Bee Culture*, November 1982, at pages 610 and 612.

BRIEF DESCRIPTION OF THE DRAWINGS

An exemplary embodiment of the invention will now be described in association with the accompanying drawings, in which.

FIG. 1 is a sectional elevation of a beehive;

FIG. 2 is a perspective exploded view of an inner cover of the beehive of FIG. 1;

FIG. 3 is a sectional elevation of an alternative design of an inner cover having a ventilating channel.

DESCRIPTION OF THE PREFERRED EMBODIMENT

The standard parts of a wooden beehive 11 include a bottom board 12, a lower brood chamber 13, an upper brood chamber or super 14, each hung with combs, an inner cover 16 and an outer cover 15.

The inner cover 16 is the main concern of the present invention.

The inner cover 16 comprises a main panel 17, held in grooves in a frame consisting of back 18, front 19 and side 20, 21 frame members. A cut-out is formed in the main panel 17, leaving side edges 22, 23 and a back edge 24. Side spacers 25, 26 are secured to the main panel 17 alongside the side edges 22, 23 respectively, and a back spacer 27 is secured along side back edge 24. A top panel 28 is secured over the spacers 25, 26, 27 and fits snugly against the front frame member 19. A bottom panel 29 is secured under the main panel 17, and also fits snugly against the front frame member 19. The bottom panel 29 however stops short by about ½ inch of the back edge 24 of the cut-out. A slot 30 is cut in the front frame member 19.

A tunnel is thus formed between the top 28 and bottom 29 panels, and between the respective side edges 22, 23 and spacers 25, 26. The tunnel stops at the back edge 24 and back spacer 27, and has an inlet port 31 formed between the bottom panel 29 and the back edge 24. The slot 30 cmprises the port at the outer end of the tunnel thus formed. The port 31 is termed the inlet port and connects with the inside of the hive, and the slot 30 is termed the outlet port and connects with the outside air. The outlet port faces the same direction as the entrance to the hive, in the bottom board 12. Because both openings are on the same wall of the hive, no draft blows through the hive irrespective of the wind direction.

The inlet port 31 is preferably located in the geometrical centre of the inner cover 16. Such location provides optimum ventilation for any and all positions of the cluster within the hive.

The main panel 17 has a feed hole 32, through which the bees may crawl to a feeding box placed over the hole, when feeding is required. The hole 32 is at other times blocked off with a cover 32a, and is not used for ventilating.

FIG. 3 shows an alternative construction of ventilating inner cover. There are now two main panels 33, 34. These are spaced apart by means of grooves in a back frame member 35, two side frame members only one, 36, of which is shown and front member 39. The lower 34 of the two panels has a slot 37 cut in its centre, and there is also a slot 38 in the front frame member 39. The two slots 37, 38 are the respective ports of a tunnel thus formed. The rest of the space between the panels 33, 34 may be filled with insulation material 40, to assist the cluster in conserving the bees' body heat. Other components of the inner cover of FIG. 3, including back spacer 27 and side spacers 25 and 26, are similar to those of the cover of FIGS. 1 and 2.

In either embodiment of inner cover according to the present invention, as described above, the usual dimensions of the ventilating channel 26 are 2 to 4 inches wide, preferably about 2.5 inches; about ⅜ to ¾ inches high; preferably about ½ to ⅝ inches; and about 9 to 12 inches long, preferably about 10 inches. The dimensions of both the inlet and outlet ports are approximately 0.5 inches by 2.5 inches; or to the width of the channel.

The inner cover as described is inexpensive to construct in either form, yet is effective to enhance greatly the number of bee colonies that not only survive the winter but that are strong and vigorous early in the new season.

What is claimed:

1. Beehive comprising:
  a brood chamber;
  a hive entrance below the brood chamber;
  a cover on top of the brood chamber;
  wherein the hive includes a ventilation tunnel, and one end or port of the tunnel opens inside the hive, and the other end or port opens to the air outside the hive;
  wherein the cover comprises an inner cover and an outer cover, and wherein the tunnel is formed as part of the inner cover which is separate from, and adapted to fit underneath, the outer cover;
  wherein the inner cover is spaced from the outer cover to leave an insulative air space therebetween, said air space being completely separate from and extending at least above said tunnel;

wherein the inner cover comprises a main panel that forms the roof of the hive, the panel being mounted in a frame;

wherein the main panel is made of sheet material;

wherein the width and height of the tunnel along its length are commensurate with the width and height of the ports;

wherein the height of the tunnel is not less than the thickness of the sheet material of said main panel; and wherein the inner end port is placed substantially in the centre of the roof of the brood chamber, and the outer end port is placed so as to face in the same direction that the hive entrance faces.

2. Beehive as claimed in claim 1, wherein the hive contains no other air passage connection between the inside and the outside, other than said hive entrance and said tunnel with its ports so disposed.

3. Beehive as claimed in claim 1, wherein the tunnel has a constant cross-section along its length.

4. Beehive as claimed in claim 3, wherein the tunnel is disposed horizontally.

5. Beehive as claimed in claim 4, wherein the inner cover also includes a secondary panel, positioned on top of the main panel;

wherein the main panel has a slot cut in its centre to define the inner end port of said tunnel;

wherein spacers are provided, placed between the main panel and the secondary panel so as to define an enclosed space, which comprises the tunnel, between the spacers and between the panels;

the spacers being so placed that the tunnel extends from the slot in the main panel to the air outside the hive; and the height of the tunnel is the distance between the main panel and the secondary panel, that distance being equal to the thickness of the spacers.

6. Beehive as claimed in claim 5, wherein the space between the main and secondary panels except the enclosed space comprising the tunnel is filled with heat insulating material.

7. Beehive, comprising:

two brood chambers;

a hive entrance below the brood chambers;

a cover on top of the brood chambers;

wherein the hive includes a ventilation tunnel, and one end or port of the tunnel opens inside the hive, and the other end or port opens to the air outside the hive;

wherein the cover comprises an inner cover and an outer cover, and wherein the tunnel is formed as part of the inner cover which is separate from, and adapted to fit underneath, the outer cover;

wherein the inner cover comprises a main panel that forms the roof of the hive, the panel being mounted in a frame;

wherein the main panel is made of sheet material;

wherein the height of the tunnel is not less than the thickness of the sheet material of said main panel;

wherein the inner end port is placed substantially in the centre of the roof of the brood chamber, and the outer end port is placed so as to face in the same direction that the hive entrance faces;

wherein the tunnel has a constant cross-section along its length;

wherein the tunnel is disposed horizontally;

wherein the main panel is formed with a cut-out extending from the centre to an edge of the panel;

wherein spacers are provided, placed at least on one side of the main panel and alongside the sides of the cut-out;

wherein the top and bottom panels are fixed to the main panel and to the spacers so as to define an enclosed space, which comprises the tunnel, between the top and bottom panels and between the spacers and the sides of the cut-out;

and the height of the tunnel is the distance between the top and bottom panels, which is the sum of the thicknesses of the spacers and of the main panel in which the cut-out is formed.

* * * * *